(12) United States Patent
Chu

(10) Patent No.: US 7,816,294 B2
(45) Date of Patent: Oct. 19, 2010

(54) METHODS AND CONFIGURATIONS FOR CATALYST REGENERATION

(75) Inventor: Humbert Chu, Houston, TX (US)

(73) Assignee: Fluor Technologies Corporation, Aliso Viejo, CA (US)

(\*) Notice: Subject to any disclaimer, the term of this patent is extended or adjusted under 35 U.S.C. 154(b) by 913 days.

(21) Appl. No.: 10/524,083

(22) PCT Filed: Aug. 21, 2002

(86) PCT No.: PCT/US02/26669

§ 371 (c)(1),
(2), (4) Date: Aug. 15, 2005

(87) PCT Pub. No.: WO2004/018092

PCT Pub. Date: Mar. 4, 2004

(65) Prior Publication Data

US 2006/0014628 A1    Jan. 19, 2006

(51) Int. Cl.
| | |
|---|---|
| *B01J 38/30* | (2006.01) |
| *B01J 38/36* | (2006.01) |
| *B01J 38/34* | (2006.01) |
| *B01J 38/28* | (2006.01) |
| *B01J 8/18* | (2006.01) |
| *F27B 15/00* | (2006.01) |
| *F23G 5/00* | (2006.01) |
| *F23G 7/00* | (2006.01) |

(52) U.S. Cl. ............ 502/42; 502/41; 502/43; 502/46; 422/142; 422/144; 110/245; 110/347

(58) Field of Classification Search ............ 422/139, 422/142, 144, 147, 178, 223; 502/41, 42, 502/43, 46, 47; 208/113, 147, 164; 110/245, 110/347

See application file for complete search history.

(56) References Cited

U.S. PATENT DOCUMENTS

| | | | |
|---|---|---|---|
| 4,313,848 A * | 2/1982 | Scott | 502/47 |
| 4,375,404 A * | 3/1983 | Myers | 208/120.01 |
| 4,849,091 A * | 7/1989 | Cabrera et al. | 208/113 |
| 4,991,521 A * | 2/1991 | Green et al. | 110/347 |
| 2006/0014628 A1 * | 1/2006 | Chu | 502/38 |

\* cited by examiner

*Primary Examiner*—Jerry Lorengo
*Assistant Examiner*—Jennifer A Smith
(74) *Attorney, Agent, or Firm*—Fish & Associates, PC

(57) ABSTRACT

A catalyst regenerator (100) has a first section (110) and a second section (120) and is operated such that carbon from a carbon-contaminated catalyst (140) is converted to carbon monoxide in the first section (110) and that carbon monoxide is converted to carbon dioxide in the second section (120). The residence time of the oxygen-containing gas in the first and second sections (110, 120) is regulated in preferred configurations by the shape (e.g., diameter) of the first and second sections (110, 120).

8 Claims, 1 Drawing Sheet

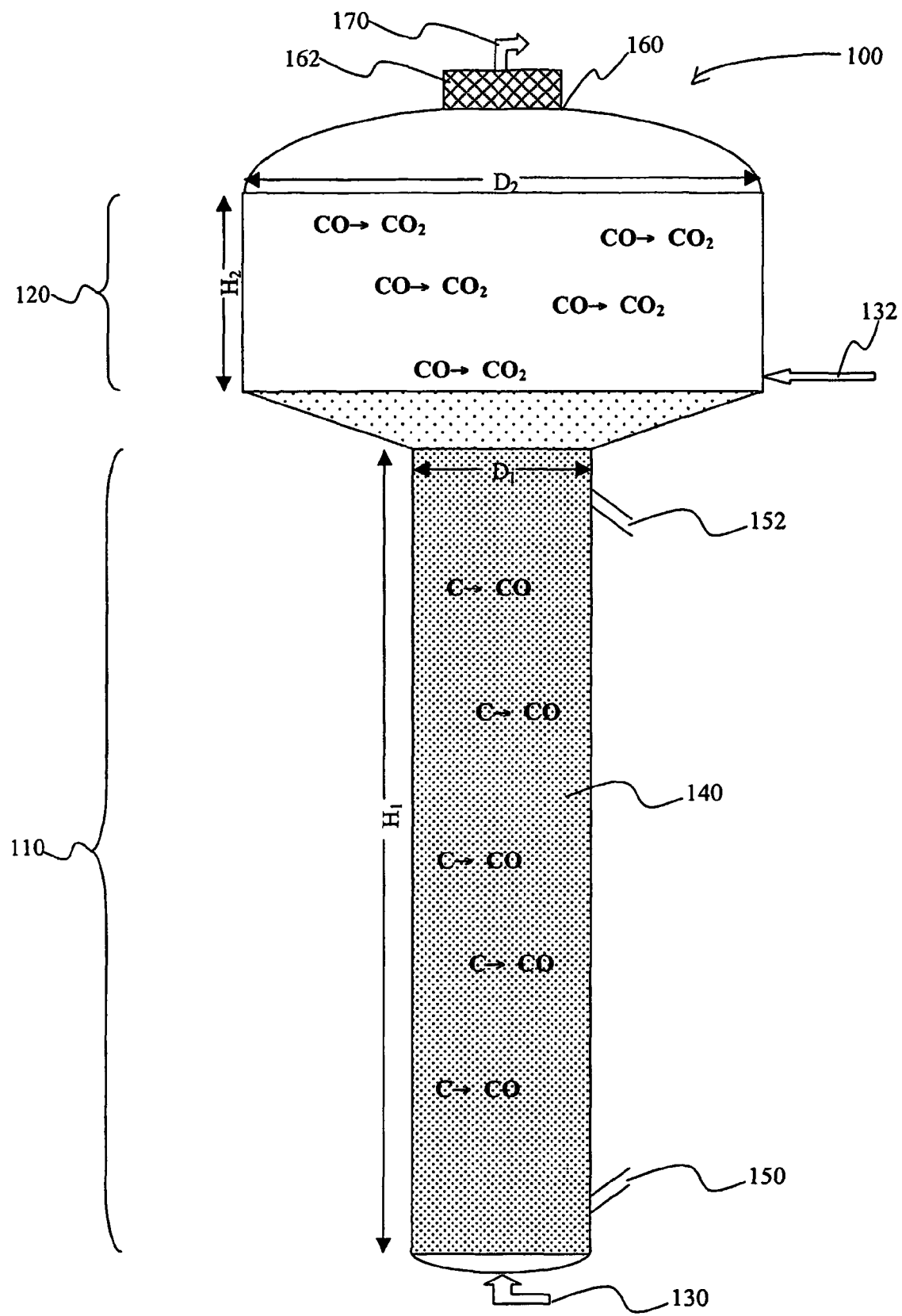

METHODS AND CONFIGURATIONS FOR CATALYST REGENERATION

FIELD OF THE INVENTION

The field of the invention is regeneration of spent catalysts, and particularly spent catalysts containing carbon.

BACKGROUND OF THE INVENTION

Numerous known processes, and especially petrochemical processes such as catalytic cracking, or hydrotreating employ solid phase catalysts to facilitate the desired reaction. While most of the known catalysts significantly improve these processes, prolonged operation and relatively harsh process conditions frequently lead to deposition of carbon (typically in form of coke) on the catalyst, thereby at least partially inactivating the catalyst.

Consequently, numerous efforts have been made to regenerate carbon-contaminated catalysts, which is often achieved by combustion of the carbon on the solid phase with oxygen to produce carbon monoxide and carbon dioxide as a waste gas stream. Removal of carbon monoxide from the waste gas has become increasingly important due to increasingly stringent standards for atmospheric emission of waste gases, and there are various methods and configurations known in the art to reduce carbon monoxide emission from regenerator vessels.

For example, combustion of carbon to carbon dioxide may be performed in the same regenerator vessel at relatively high temperatures (e.g., above 1200° F.) to ensure combustion to carbon dioxide while substantially reducing the concentration of carbon monoxide in the effluent of the regenerator vessel (The combustion of carbon to carbon dioxide is a two-step reaction via the intermediate carbon monoxide). Exemplary configurations of such systems are described in U.S. Pat. Nos. 4,325,833 and 4,313,848 to Scott, in U.S. Pat. No. 4,051,069 to Bunn, Jr., et al., or in U.S. Pat. No. 4,991,521 to Green et al.

While relatively high temperatures generally reduce carbon monoxide emission, most, if not all regenerator vessels operating at such high temperatures will typically require expensive metals and other protective structures to withstand the thermal stress. Moreover, depending on the particular nature of the catalyst, sintering may occur at such temperatures. Still further, due to the relatively slow overall rate of conversion, regenerator vessels operating at high temperatures tend to be relatively large.

To circumvent at least some of the problems associated with high temperature, catalyst regeneration may be performed in separate vessels, wherein the carbon in the first vessel is incompletely combusted to a mixture of carbon monoxide and carbon dioxide, and wherein the mixture is then further combusted in a carbon monoxide boiler to carbon dioxide. Separate combustion of carbon monoxide in a carbon monoxide boiler to carbon dioxide typically provides an effluent gas with relatively low carbon monoxide concentration (e.g., less than 500 ppm). However, carbon monoxide boilers typically require significant quantities of energy for proper operation. Moreover, shutdown of the carbon monoxide boiler for maintenance or other reasons imposes a severe limitation on continuous operation of catalyst regeneration, and typically reduces regeneration capacity during shutdown at least 70%.

Thus, although many methods and configurations for catalyst regeneration are known in the art, all or almost all of them suffer from various disadvantages. Therefore, there is still a need to provide improved configurations and methods for catalyst regeneration.

SUMMARY OF THE INVENTION

The present invention is directed to catalyst regeneration in which a contaminant is in a two-step reaction removed from a catalyst and converted to a product using an oxygen-containing gas, wherein the first step in the two-step reaction is selectively performed in a first portion of a vessel, and wherein the second step in the two-step reaction is selectively performed in a second portion of a vessel, wherein control over the selective reactions is at least in part provided by the residence time of the oxygen-containing gas in the first and second sections.

Thus, in one aspect of the inventive subject matter, contemplated regenerators have a first section fluidly coupled to a second section. The first section receives an oxygen-containing gas at a predetermined flow rate and contains carbon-contaminated catalyst, wherein the first section is configured to provide a residence time of the oxygen-containing gas effective to selectively produce carbon monoxide from the carbon-contaminated catalyst, and the second section is configured to provide a second residence time of the oxygen-containing gas and carbon monoxide effective to produce carbon dioxide from the carbon monoxide.

In a further contemplated aspect, the first section and the second section in preferred regenerators have a substantially circular horizontal cross section, and it is especially preferred that the first section has a first height $H_1$ and a first diameter $D_1$, wherein the second section has a second height $H_1$ and a second diameter $D_1$, and wherein $D_2:D_1$ is at least 2.5 and $H_2:H_1$ is at least 0.6. Furthermore, it is contemplated that the first section is preferably operated at a temperature of less than 700° F., and the second section is preferably operated at a temperature of less than 1100° F.

In still further contemplated aspects, the carbon-contaminated catalyst is fluidized in the first section at least in part at the predetermined flow rate of the oxygen-containing gas, and the second residence time of the oxygen-containing gas and carbon monoxide in the second section is sufficient to precipitate substantially all of the carbon-contaminated catalyst carried over from the first section. Moreover, the second section may receive a second oxygen-containing gas comprising molecular oxygen, especially in configurations where the oxygen-containing gas of the first section comprises an amount of molecular oxygen that is substantially equal or less than an amount required to convert substantially all of the carbon of the carbon-contaminated catalyst to carbon monoxide in the first section. Suitable regenerators may further include a catalyst coupled to the second section that converts residual carbon monoxide to carbon dioxide.

Consequently, a method of regenerating a catalyst may include a step in which a regenerator vessel is provided having a first section fluidly coupled to a second section, wherein the first section contains carbon-contaminated catalyst. In a further step, an oxygen-containing gas is fed to the first section at a predetermined flow rate, wherein the first section is configured to provide a residence time of the oxygen-containing gas effective to selectively produce carbon monoxide from the carbon-contaminated catalyst, and wherein the second section is configured to provide a second residence time of the oxygen-containing gas and carbon monoxide effective to produce carbon dioxide from the carbon monoxide.

BRIEF DESCRIPTION OF THE DRAWING

FIG. 1 is a an exemplary configuration of a catalyst regenerator according to the inventive subject matter.

DETAILED DESCRIPTION

The inventor has performed various calculations to more precisely elucidate kinetics and equilibria for the two reactions governing oxidation of carbon to carbon dioxide via carbon monoxide, especially as it relates to regeneration of spent catalysts or solid particles in a fluidized vessel.

Surprisingly, the data suggest for the limiting-step reaction (formation of carbon dioxide from carbon monoxide) that the conversion of carbon monoxide to carbon dioxide is not equilibrium limited. Consequently, this conversion is thought to be kinetically limited, and will therefore be significantly affected by pressure, temperature, residence time, oxygen intake, and effectiveness of mixing. Furthermore, calculations for the initial reaction (formation of carbon monoxide from carbon) indicated that the initial reaction is very rapid. Consequently, the inventor contemplates that the initial reaction may be conducted at relatively low temperature, low oxygen intake, and short residence time. Viewed from another perspective, it should be appreciated that each of the two-step reactions has significantly different requirements in process kinetics. Moreover, additional calculations on the heat of reaction suggested that the heat of reaction for the conversion of carbon monoxide to carbon dioxide is significantly higher than the heat of reaction for the conversion of carbon to carbon monoxide.

Therefore, the inventor contemplates that the conversion of carbon from a catalyst to carbon dioxide via the intermediate carbon monoxide can be performed in a single vessel, wherein the first reaction from carbon to carbon monoxide is selectively performed in a first section of the vessel at a first temperature, and wherein the second reaction from carbon monoxide to carbon dioxide is selectively performed in a second section of the vessel at a second temperature.

Consequently, in a particularly preferred aspect of the inventive subject matter, a regenerator vessel may include a first section containing a carbon-contaminated catalyst and receiving an oxygen-containing gas at a flow rate, wherein the first section has a first width and first volume. In contemplated vessels, a second section is fluidly coupled to the first section, wherein the second section has a second width and second volume, wherein the first width and first volume and the second width and second volume are selected such that at the flow rate (a) the oxygen-containing gas has a residence time in the first section effective to selectively produce carbon monoxide from the carbon-contaminated catalyst, and (b) the oxygen-containing gas has a residence time in the second section effective to produce carbon dioxide from the carbon monoxide.

As used herein, the term "residence time" of a gas in a vessel or section of the vessel refers to the time which a predetermined volume of the gas requires to move through an imaginary horizontal plane through the vessel or section of the vessel. As also used herein, the term "selectively produce carbon monoxide from the carbon-contaminated catalyst" means that the ratio of carbon monoxide from the carbon-contaminated catalyst to carbon dioxide (produced from carbon monoxide) is at least 8:2, typically at least 9:1, more typically at least 9.5:1, and most typically at least 9.8:1.

A particularly preferred exemplary configuration of a contemplated regenerator 100 is depicted in FIG. 1, in which regenerator 100 has a first section 110 (having height $H_1$ and diameter $D_1$) that is fluidly coupled to a second section 120 (having height $H_2$ and diameter $D_2$). Oxygen-containing gas 130 enters the first section 110 and provides (at least partial) fluidization of the carbon-contaminated catalyst beds 140 in the first section 110. Where the regenerator 100 is continuously operated, regenerated catalyst 140' (not shown) is retrieved from the first section via opening 152, and carbon-contaminated catalyst 140 is provided to the first section via opening 150. Second section 120 receives (optional) secondary oxygen-containing gas 132, and the vent opening 160 of the second section 120 is coupled to a catalyst 162 that converts residual carbon monoxide to carbon dioxide in the vent gas 170.

It is generally contemplated that the first section and the second section in regenerators according to the inventive subject matter will have a substantially circular (i.e., deviation in radius between two radii no more than 15%) horizontal cross section. However, in alternative aspects, it should also be recognized that a particular shape of a section may be altered to adapt to a particular spatial or other requirement. For example, where suitable, the first or second section may have a square-shaped horizontal cross section. Regardless of the particular shape of the first and second sections, however, it should be appreciated that first and second sections are configured such that the residence time of the oxygen-containing gas (which may or may not include carbon monoxide and/or carbon dioxide) in the first section is less than the residence time of the oxygen-containing gas (which may or may not include carbon monoxide and/or carbon dioxide) in the second section.

Consequently, and especially where the regeneration involves oxidation of carbon to carbon dioxide via carbon monoxide, it is preferred that the first section has a first height $H_1$ and a first diameter $D_1$, the second section has a second height $H_2$ and a second diameter $D_2$, and that the ratio of $D_2:D_1$ is at least 2.5 and the ratio of $H_2:H_1$ is at least 0.6.

With respect to the first section, it is generally preferred that a substantial portion (i.e., at least 60%, more typically at least 75%, and most typically at least 90%) of the carbon-contaminated catalyst is regenerated in the first section, preferably under conditions that thermodynamically and/or kinetically favor formation of carbon monoxide from carbon, but not, or only to a minor extent, formation of carbon dioxide from carbon (via carbon monoxide). Consequently, it is generally preferred to operate the first section at a temperature of less than 700° F.

Addition of spent catalyst (i.e., carbon-contaminated catalyst) to the first section is preferably performed through one or more ports proximal to the bottom portion of the first section. Depending on the type of regeneration method, it is further contemplated that addition of the catalyst may be continuous or batch-wise. Regenerated catalyst is preferably removed from the first section, and the particular place of removal will at least in part depend on the shape and operation of the first section. However, it is generally preferred that the removal of regenerated catalyst is proximal to either the bottom or the top of the first section. During operation, it is generally preferred that the carbon-contaminated catalyst is fluidized in the first section. However, non-fluidized bed operational modes are also considered suitable and especially include batch-mode operation (see below). Where the spent catalyst is fluidized, it is especially preferred that fluidization is at least in part provided by the predetermined flow rate of the oxygen-containing gas.

It should be particularly appreciated that since the formation of carbon monoxide from the carbon on the catalyst is fast and has lower kinetics requirement than the requirements for subsequent conversion of carbon monoxide to carbon dioxide, the first section is configured to promote the first reaction (formation of carbon monoxide from the carbon) at a lower temperature, a lower residence time, and lower oxygen intake. Thus, it is contemplated that preferred first sections will provide sufficient contact between carbon-bearing catalyst and oxygen in the oxygen-containing gas to convert substantially all carbon to predominantly carbon monoxide. The relatively low temperature in the first section is particularly advantageous, since such operational temperatures allow use of less expensive metals and lower temperature tolerant catalysts (and particularly those with lower sintering temperatures). Furthermore, it should be recognized that by virtue of the relatively low residence time requirement, the vessel diameter may be significantly reduced. Moreover, it should be recognized that the heat of reaction from converting carbon to carbon monoxide and sulfur to sulfur dioxide (for a carbon and sulfur-bearing catalyst) will predominantly provide the increase in process temperature.

Process condition in first section: It is generally contemplated that the first section of the regenerator unit will be designed under optimum process conditions (with properly selected temperature, residence time and $O_2$ intake) to ensure that sufficient conversion of carbon from all spent catalysts to CO has occurred in first section. Optimum process conditions can be easily determined by monitoring the carbon content on the regenerated catalysts leaving the regenerator (e.g., in grams of carbon per gram of catalyst).

For example, the process temperature in first section is generally set to the lowest point possible (based on the remaining carbon on the catalyst) to reduce energy costs and damage to the catalyst while ensuring complete or sufficient (less than the maximum acceptable residual carbon in the regenerated catalyst) conversion of C to CO in first section. Calculations (see below) and commercially available data have shown this required temperature to be far less than the 1200° F. operating temperature often used in a commercial unit, and can be as low as 700° F., and even less.

As an example, the inventor contemplates $N_2$ as an inert fluidization gas and air as the oxygen source. A predetermined rate of air (typically containing about 21% $O_2$) will be continuously injected into the $N_2$ fluidization gas before the $N_2$ gas enters the regenerator. The $N_2$/air gas also serves as a heat sink to absorb the heat produced from the exothermic reaction (predominantly conversion of C to CO). The $N_2$/air mixture will be preheated before entering the regenerator unit which provides another means (control degree of preheat) to control the temperature of the first section (e.g., to prevent run-off temperature).

The amount of required air injection rate to $N_2$ fluidization gas feed is calculated based the need to sufficiently converting all C on catalysts to CO; to compensate for non-ideal mixing and inefficient contact between C on catalysts and $O_2$; and to satisfy the $O_2$ need for the inevitable amount of conversion of CO to $CO_2$. Note that the higher the $N_2$ intake rate (without exceeding the maximum fluidization gas rate), the lower the process temperature in first section.

Similarly, the oxygen demand in the first section may be determined by the following considerations: (a) Conversion of all (or sufficient) C on catalyst to CO, and further conversion of the produced CO to $CO_2$, and (b) additional oxygen and/or air to compensate for non-ideal mixing and insufficient contact between $O_2$ and carbon on catalysts. Therefore, it should be recognized that the first section in preferred configurations provides an $O_2$ deficient environment with respect to complete conversion of all C to $CO_2$, and an $O_2$ oversaturated environment with respect to conversion of all C to CO. Thus, and based on the rapid kinetics of conversion of C to CO, a relatively low residence time in first section is required to promote the conversion of C to CO, which translates to a relatively small diameter of first section (as compared to the second section) and material savings.

With respect to the second section, it is generally contemplated that the shape and/or configuration is such that the velocity of the oxygen-containing gas comprising carbon monoxide in the second section is sufficiently low to precipitate substantially all (i.e., at least 90%, more typically at least 95%, and most typically at least 99%) of the carbon-contaminated catalyst carried over from the first section. Moreover, it is generally contemplated that the second section is configured to provide a (second) residence time of the oxygen-containing gas and carbon monoxide coming from the first section effective to allow formation of carbon dioxide from the carbon monoxide produced in the first section.

It is generally preferred that the second section is continuous with the first section, wherein the transition from the first to the second section may include a tapered portion (as shown in FIG. 1), a rounded or otherwise shaped portion, or that the first section is directly coupled to a second section. A further particularly preferred additional component of the second section is a secondary oxygen-containing gas inlet that may provide an oxygen-containing gas that includes oxygen, preferably in an amount equivalent to an at least 1.1-fold molar excess over the carbon monoxide in the second section. It should further be especially appreciated that the second section is preferably operated at a temperature of less than 1100° F., which is the generally accepted maximum allowable operating temperature for 316 stainless steel.

Thus, it should be particularly recognized that the first section is fluidly coupled to a "strategically expanded" second section of the same regenerator vessel, wherein the majority of carbon monoxide is oxidized to carbon dioxide at higher temperature, extended residence time, and relatively high concentrations (e.g., 2-fold molar excess) of oxygen. Consequently, the high residence time translates in preferred configurations into a larger vessel diameter for the expanded section. Furthermore, the diameter and height of this expanded section of the vessel is strategically selected to provide sufficient residence time to promote the kinetically driven conversion of carbon monoxide to carbon dioxide. It should be especially appreciated that the resulting appreciable amount of heat of reaction of the conversion of carbon monoxide to carbon dioxide will provide the energy for the process temperature in the upper expanded section.

Moreover, it is generally contemplated that catalyst entering the second section from the first section will already have a significantly reduced carbon content (previously removed in the first section), and it is expected that the residence time of the catalyst entering the second section will be sufficiently short (due to the lower flow rate in the second section) to avoid or reduce damage of the catalyst by the more severe process conditions in the second section.

In an especially advantageous aspect of the inventive subject matter, it should be recognized that the expansion in the second section will (besides increase in residence time and settling of catalyst) also serve as a surge vessel to dampen any cyclic or other peak production of carbon monoxide coming from the first section of the regenerator.

Furthermore it is contemplated that numerous gases are suitable as oxygen-containing gas for contemplated configurations and methods: and the choice of a particular oxygen-containing gas will predominantly depend on the particular type of reaction performed in the regenerator. In fact, it should be recognized that any gas comprising oxygen is suitable, so long as non-oxygen component(s) of the gas will not exhibit adverse effect on the catalysts (e.g., reduce capacity of the catalyst). However, it is generally preferred, and especially where the catalyst comprises a carbon-contaminated catalyst, that the regenerator gas includes molecular oxygen.

Therefore, suitable regenerator gases include ambient air, oxygen-enriched or oxygen-depleted (ie., having an oxygen content of less than 20 mol %) air, and numerous other natural and synthetic gases. Furthermore especially preferred oxygen-containing gases, and c particularly those introduced into the first section of the regeneration vessel will comprise an amount of molecular oxygen that is substantially equal (i.e., ±5%) or less (e.g., between 5% and 25%, and even lower) than an amount required to convert substantially all of the carbon (i.e., at least 92%, more typically at least 95%) of the carbon-contaminated catalyst to carbon monoxide in the first section.

Similarly, the nature of appropriate secondary oxygen-containing gases (i.e., oxygen-containing gas introduced into the second section) may vary considerably, and the same considerations as described for the oxygen-containing gas above apply. However, in an especially preferred alternative aspect, the secondary oxygen-containing gas comprises oxygen in amount of at least 110%, more typically at least 130% of the amount required to convert substantially all of the carbon monoxide (ie., at least 95%, more typically at least 98%) from the first section to carbon dioxide in the second section.

It is generally contemplated that the second section is operated to predominantly service a gas phase reaction to convert CO to $CO_2$ (however, some conversion of C to CO may still take place on the small amount of catalysts entering the second section). Such CO conversion to $CO_2$ in the gas phase may be promoted by increase of residence time of the CO in the second section and/or increase of $O_2$ intake into the second section (via first section and/or separate oxygen intake). Since the CO to CO2 conversion is a highly exothermic process, it is generally contemplated that the process temperature in the second section will be monitored in order not to exceed the material temperature limit.

Calculation (see below) and commercial data have shown that the process temperature in the second section can be maintained at or below 1100° F. and still promote sufficient conversion of CO to $CO_2$. In the event that the process temperature falls below a threshold for complete CO2 formation, it is contemplated that a catalyst at exit of the second section will further promote the conversion of residual CO to CO2 (wherein the exiting gas will have a sufficiently high temperature). Alternatively, or additionally, the second section of the regenerator vessel wall may be reinforced with fire brick to accommodate occasional or permanent temperatures of higher than 1100° F. Moreover, there are various alloy metals known in the art that resist temperatures higher than 1100° F., and all of those may be employed fore use herein. It should be especially noted that temperatures exceeding 1100° F. are tolerable in the second section, since substantially no catalyst is present in the second section (or present long enough to be damaged).

$O_2$ control in the second section is relatively simple since the reaction in the second section is mostly a gas phase reaction (conversion in the second section of the $CO_2$ from the CO rising from the first section). Therefore, where appropriate, supplemental oxygen or oxygen-containing gas may be introduced into the second section and/or residence time of the CO may be increased.

Contemplated catalysts generally include all catalysts that can be contaminated during participation in a reaction, and especially those where the contamination can be removed by oxidation with oxygen ($O_2$). Consequently, contemplated contaminations particularly include carbon (e.g., in the form of coke) and sulfur. Therefore, especially contemplated catalysts include those commonly employed in hydrotreating, hydrocracking, and FCC cracking. While not limiting to the inventive subject matter, further particularly contemplated catalysts include those that tend to sinter at or above a temperature of about 1100° F.

In still further contemplated regenerator configurations, and especially where the increased residence time increased temperature from the onset of the exothermic reaction of converting carbon monoxide to carbon dioxide is not sufficient to meet the carbon monoxide emission requirements, additional components may be added to the regenerator. For example, in a particularly preferred option, a secondary oxygen/air intake stream may be provided to the second section or an additional mixing device inside the section. Moreover, "in-situ" catalytic carbon monoxide oxidization units may be coupled to the outlet of the regenerator.

Thus, and especially considering the foregoing, a particularly preferred regenerator will include a first section having a first height $H_1$ and a first diameter $D_1$ and second section having a second-height $H_1$ and a second diameter $D_1$, wherein $D_2:D_1$ is at least 2.5, $H_2:H_1$ is at least 0.6, wherein carbon from a carbon-contaminated catalyst is selectively converted to carbon monoxide in the first section, and wherein the carbon monoxide from the first section is selectively converted to carbon dioxide in the second section.

Consequently, a method of regenerating a catalyst will include one step in which a regenerator vessel is provided having a first section fluidly coupled to a second section, wherein the first section contains carbon-contaminated catalyst. In another step, an oxygen-containing gas is fed at a predetermined flow rate to the first section, wherein the first section is configured to provide a residence time of the oxygen-containing gas effective to selectively produce carbon monoxide from the carbon-contaminated catalyst, and wherein the second section is configured to provide a second residence time of the oxygen-containing gas and carbon monoxide effective to produce carbon dioxide from the carbon monoxide. With respect to the first and second sections, the carbon-contaminated catalyst, the oxygen-containing gas, the flow rate, and the residence time, the same considerations as described above apply.

It should be recognized that contemplated methods and configurations are particularly useful in numerous applications, and an especially preferred use is in an FCC (Fluidized Catalytic Cracking) process for regeneration of spent catalysts, where known regenerators typically require high temperature resistant metals to complete oxidation in both reactions in the same regenerator vessel. Other especially useful applications of contemplated regenerators include commercial catalyst regeneration plants where oxidation of carbon is achieved in a single fluidized bed vessel. Such known vessels typically produce 2000 ppm carbon monoxide in the regenerator effluent stream, which is then burned off in a carbon monoxide boiler.

In yet another alternative aspect of the inventive subject matter, it should be recognized that while a fluidized bed operation of contemplated regenerators is particularly preferred, batch mode, and especially an alternating batch mode may be employed to regenerate the catalyst. In such configurations, two devices according to the inventive subject matter may be fluidly coupled such that a first device operates as a regenerator, while a second device operates as catalytic reactor until the catalyst is sufficiently carbon-contaminated. Once the second reactor contains enough carbon-contaminated catalyst and the first reactor has regenerated the catalyst to a sufficient amount, the operation is switched such that the first device operates as a catalytic reactor, and the second device operates as a regenerator.

Moreover, the inventive concept presented herein need not be limited to a particular application, so long as alternative applications require a reaction vessel and proceed from an educt to a product via an intermediate through two kinetically different reactions. Thus, it should generally be appreciated that a flow-through reactor for reacting a reagent via an intermediate to a product may comprise a first section fluidly coupled to a second section, wherein the first section receives a reactant at a predetermined flow rate and contains the reagent, wherein the first section is configured to provide a residence time of the reactant effective to selectively produce the intermediate from the reagent, and wherein the second section is configured to provide a second residence time of the reactant and the intermediate effective to produce the product from the intermediate.

EXAMPLES

Gas Phase Equilibrium Calculation

The formulae below were used for the calculations of equilibrium constants for the conversion of CO to $CO_2$. As can be clearly seen, the carbon to carbon monoxide reaction is very fast while the conversion of carbon monoxide to carbon dioxide is limiting and relatively slow. The equilibrium constant for the limiting reaction at 1000° F. (538° K) is calculated by using Gibbs energy, entropy and enthalpy to be $2.89 \times 10^{27}$, which is a relatively strong indicator that the carbon monoxide peak concentration in known regenerator vessels of 1000 to 1500 ppm is not equilibrium limited. Consequently, under equilibrium condition, carbon monoxide should be non-detectable. Viewed from another perspective, carbon monoxide peak production of 1500 ppm is severely limited by kinetics.

$2CO+O_2 \rightarrow 2CO_2$ (Equation 1)

| | | | |
|---|---|---|---|
| $\Delta G°_f$ (kJ/mol) | −137.168 | 0 | −394.359 |
| $\Delta H°_f$ (kJ/mol) | −110.525 | 0 | −393.509 |
| $S°$ (J/Kmol) | 197.674 | 205.138 | 213.74 |

Consequently, $\Delta G°_{rxn}=(2\times-394.359)-(2\times-137.168+0)=-514.382$ kJ/mol, $\Delta H°_{rxn}=(2\times-393.509)-(2\times-110.525+0)=-565.968$ kJ/mol.

$\Delta S°_{rxn}=(2\times213.74)-(2\times197.674+205.138)=-173.006$ J/K mol.

Based on $\Delta G°=-RT \ln K_{eq}$, $\Delta G°=\Delta H-T\Delta S°$, and $\Delta H°-T\Delta S°=-RT \ln K_{eq}$:

$\ln K_{eq}=-\Delta H°/RT+\Delta S°/R$ and therefore $R=8.314$ J/K mol.

At a regenerator temperature of T=1000° F. (810° K.):

$\ln K_{eq}=-\Delta H°/RT+\Delta S°/R$, $\ln K_{eq}=-[-565.968 \text{ kJ/mol}/(0.008314 \text{ kJ/K mol} \times 810K)]+[-0.173006 \text{ kJ/K mol}/0.008314 \text{ kJ/K mol}]$:

$\ln K_{eq}=63.233$, which results in $K_{eq}=2.89\times10^{27}$

When the reaction reaches equilibrium, $K_{eq}=[CO_2]^2/[CO]^2[O_2]=2.89\times10^{27}$ $2CO+O_2 \rightarrow 2CO_2$ 100 ppm 4% 2-4%

At non-equilibrium conditions, $Q=[CO_2]^2/[CO]^2[O_2]=[2]^2/[0.1]^2[4]=100$ Therefore $Q<<K_{eq}$ Gas Phase Rate Constant for CO Conversion By assuming a second-order reaction, the calculations below present calculations of the kinetic rate constant for a gas phase reaction over a temperature range of 900 to 1500° F.

(slow) $CO+O_2 \rightarrow CO_2+O$         Equation 2

(fast) $O+CO \rightarrow CO_2$         Equation 3

(total) $2CO+O_2 \rightarrow 2CO_2$         Equation 1

The empirical correlation of rate constant, in the form of the Arrhenius equation, is obtained from the NIST database for the rate determining slow step (Equation 2).

The calculation showed that the rate constant at 1500° F. is 1942 times the rate constant at 1000° F., the maximum operating temperature of the regenerator. This confirms the well known observation that carbon monoxide can be easily destroyed at 1500° F. The calculation further showed that the rate constant at 1100° F. and 1200° F. are 6.8 and 35.6 times respectively the rate constant at 1000° F. Although the inventor contemplates that gas phase kinetics alone will only incompletely represent the gas-solid interface reaction (with the presence of a gas-solid interface, the activation energy is likely drastically reduced), it is contemplated that the 35.6 times improvement in gas phase kinetics, for instance, between 900 to 1200° F. may exhibit sufficient impact on the overall kinetics to lower carbon monoxide peak production to a level of less than 500 ppm.

Calculation: Gas phase kinetics rate constant calculations (using data from NIST and assuming a second order rate limiting reaction for equation 2)

Rate=$k[CO][O_2]$ $k=Ae^{-Ea/RT}=4.2\times10^{-12}e^{-199547/8.314\times T}=4.2\times10^{-12}e^{-199547/8.314\times810}=5.67\times10^{-25}$ Therefore:

| T(° F.) | T(K) | 1000/T(K) | k | k/k @ 1000° F. |
|---|---|---|---|---|
| 900 | 755 | 1.325 | $6.56 \times 10^{-26}$ | 0.115 |
| 1000 | 810 | 1.234 | $5.67 \times 10^{-25}$ | 1 |
| 1050 | 839 | 1.19 | $1.58 \times 10^{-24}$ | 2.8 |
| 1100 | 866 | 1.155 | $3.86 \times 10^{-24}$ | 6.8 |

-continued

| T(° F.) | T(K) | 1000/T(K) | k | k/k @ 1000° F. |
|---|---|---|---|---|
| 1200 | 921 | 1.086 | $2.02 \times 10^{-23}$ | 35.6 |
| 1500 | 1088 | 0.919 | $1.10 \times 10^{-21}$ | 1942 |

Under the assumption that the carbon monoxide content in the regenerator effluent is proportional (realizing that gas phase reaction alone likely will not accurately represent the gas-solid interface reaction) to the second order rate constant with carbon monoxide content at 1000° F. being 1000 ppm, the following is the calculated carbon monoxide content in a regenerator effluent.

| T [° F.] | k/k at 1000° F. | CO content in regenerator effluent |
|---|---|---|
| 900 | 0.115 | 8695 ppm |
| 1000 | 1 | 1000 ppm |
| 1050 | 2.8 | 357 ppm |
| 1100 | 6.8 | 147 ppm |
| 1200 | 35.6 | 28 ppm |
| 1500 | 1942 | 0.5 ppm |

Thus, it should be recognized that, based on the equilibrium K-value for the conversion of carbon monoxide to carbon dioxide ($K=2.89 \times 10^{27}$ at 1000° F.), the conversion of carbon monoxide to carbon dioxide is not equilibrium limited. Furthermore, based on the calculated second order reaction rate constant for conversion of carbon monoxide to carbon dioxide at different temperatures ($k=5.67 \times 10^{27}$ at 1000° F.), it should be recognized that a temperature increase in the temperature range of 900 to 1200° F. (which has generally been considered too low for complete combustion), will have a significant impact on the kinetics of converting carbon monoxide to carbon dioxide.

Still further, based on the second order reaction rate constant for converting carbon on solid particles to carbon monoxide ($k=1.6 \times 10^{-11}$ at 68° F.) the inventor contemplates that the rate constant for converting carbon to carbon monoxide may be as high as 14 orders of magnitude higher than the rate constant for converting carbon monoxide to carbon dioxide, confirming the observation that conversion of carbon to carbon monoxide is much faster than conversion of carbon monoxide to carbon dioxide. Therefore, it should be recognized that the two reactions can be segregated.

Moreover, it should be especially appreciated that, based on the heat of reaction under ambient temperature (for the reaction C to CO, S to $SO_2$, and CO to CO2), the heat of reaction for converting carbon monoxide to carbon dioxide (−566 kJ) is significantly higher than that of converting carbon to carbon monoxide (−221 kJ). For example, in the case of sulfur bearing catalyst, the heat of reaction for converting carbon monoxide to carbon dioxide is roughly equal to the sum of heat of reaction for converting carbon to carbon monoxide (−221 kJ) and S to $SO_2$ (−296 kJ). Consequently, it is contemplated that one can use the heat of reaction for converting carbon monoxide to carbon dioxide as effective energy source for gas heating.

Based on the foregoing calculations and observations, the inventor contemplates that every 1.7-time increase of the vessel diameter will be equivalent to a 50° F. increase in process temperature for kinetics enhancement, and that every 2.5-time increase of vessel diameter will be equivalent to 100° F. increase in process temperature for kinetics enhancement.

Thus, specific configurations and methods of improved catalyst regenerators have been disclosed. It should be apparent, however, to those skilled in the art that many more modifications besides those already described are possible without departing from the inventive concepts herein. The inventive subject matter, therefore, is not to be restricted except in the spirit of the-appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of regenerating a catalyst comprising:
providing a reactor vessel having a first section with a first width, wherein an outwardly tapered transition portion is coupled to the first section to so increase the first width, and wherein the tapered transition portion is coupled to a second section having a second width, wherein the first section has a diameter that is less than a diameter of the second section;
feeding a carbon-contaminated catalyst and an oxygen-containing gas at a predetermined flow rate to the first section to co-currently regenerate substantially all of the catalyst in the first section;
wherein the first section is configured to provide a residence time of the oxygen-containing gas effective to selectively produce carbon monoxide from the carbon-contaminated catalyst such that a ratio of the carbon monoxide from the carbon-contaminated catalyst to carbon dioxide produced from the carbon monoxide is at least 9:1; and
wherein the second section is configured to provide a second residence time of the oxygen-containing gas and carbon monoxide effective to produce carbon dioxide from the carbon monoxide.

2. The method of claim 1 wherein the first section has a first height H1 and a first diameter D1, wherein the second section has a second height H2 and a second diameter D2, and wherein D2:D1 is at least 2.5 and H2:H1 is at least 0.6.

3. The method of claim 1 further comprising operating the first section at a temperature of less than 700° F. and operating the second section at a temperature of less than 1100° F.

4. The method of claim 1 wherein the second residence time of the oxygen-containing gas and carbon monoxide in the second section is sufficient to precipitate substantially all of the carbon-contaminated catalyst carried over from the first section.

5. The method of claim 1 further comprising feeding a second oxygen-containing gas comprising molecular oxygen to the second section.

6. The method of claim 1 wherein the oxygen-containing gas of the first section comprises an amount of molecular oxygen that is substantially equal or less than an amount required to convert substantially all of the carbon of the carbon-contaminated catalyst to carbon monoxide in the first section.

7. The method of claim 1 further comprising continuously providing the first section with carbon-contaminated catalyst.

8. The method of claim 1 further comprising coupling a catalyst to the second section that converts residual carbon monoxide to carbon dioxide.

* * * * *